G. G. MORIN

Oct. 11, 1932. SEMIAUTOMATIC DIPPER TRIP AND MONKEY LINE WINDER Re. 18,617

Original Filed Aug. 9, 1927 5 Sheets-Sheet 1

WITNESSES
William P. Goebel
A. L. Kitchin

INVENTOR
George G. Morin
BY
Munn & Co.
ATTORNEY

G. G. MORIN

Oct. 11, 1932. SEMIAUTOMATIC DIPPER TRIP AND MONKEY LINE WINDER Re. 18,617

Original Filed Aug. 9, 1927 5 Sheets-Sheet 2

WITNESSES

William P. Goebel.

A. L. Kitelin.

INVENTOR

George G. Morin

BY Munn & Co.

ATTORNEY

G. G. MORIN

Oct. 11, 1932. SEMIAUTOMATIC DIPPER TRIP AND MONKEY LINE WINDER Re. 18,617

Original Filed Aug. 9, 1927 5 Sheets-Sheet 3

WITNESSES

William P. Goebel

A. L. Kitchin

INVENTOR

George G. Morin

BY Munn & Co

ATTORNEY.

G. G. MORIN

Oct. 11, 1932. SEMIAUTOMATIC DIPPER TRIP AND MONKEY LINE WINDER Re. 18,617

Original Filed Aug. 9, 1927 5 Sheets-Sheet 4

WITNESSES

William P. Goebel

A. L. Kitchin

INVENTOR

George G. Morin

BY Munn & Co.

ATTORNEY

G. G. MORIN
Oct. 11, 1932. SEMIAUTOMATIC DIPPER TRIP AND MONKEY LINE WINDER Re. 18,617
Original Filed Aug. 9, 1927 5 Sheets-Sheet 5
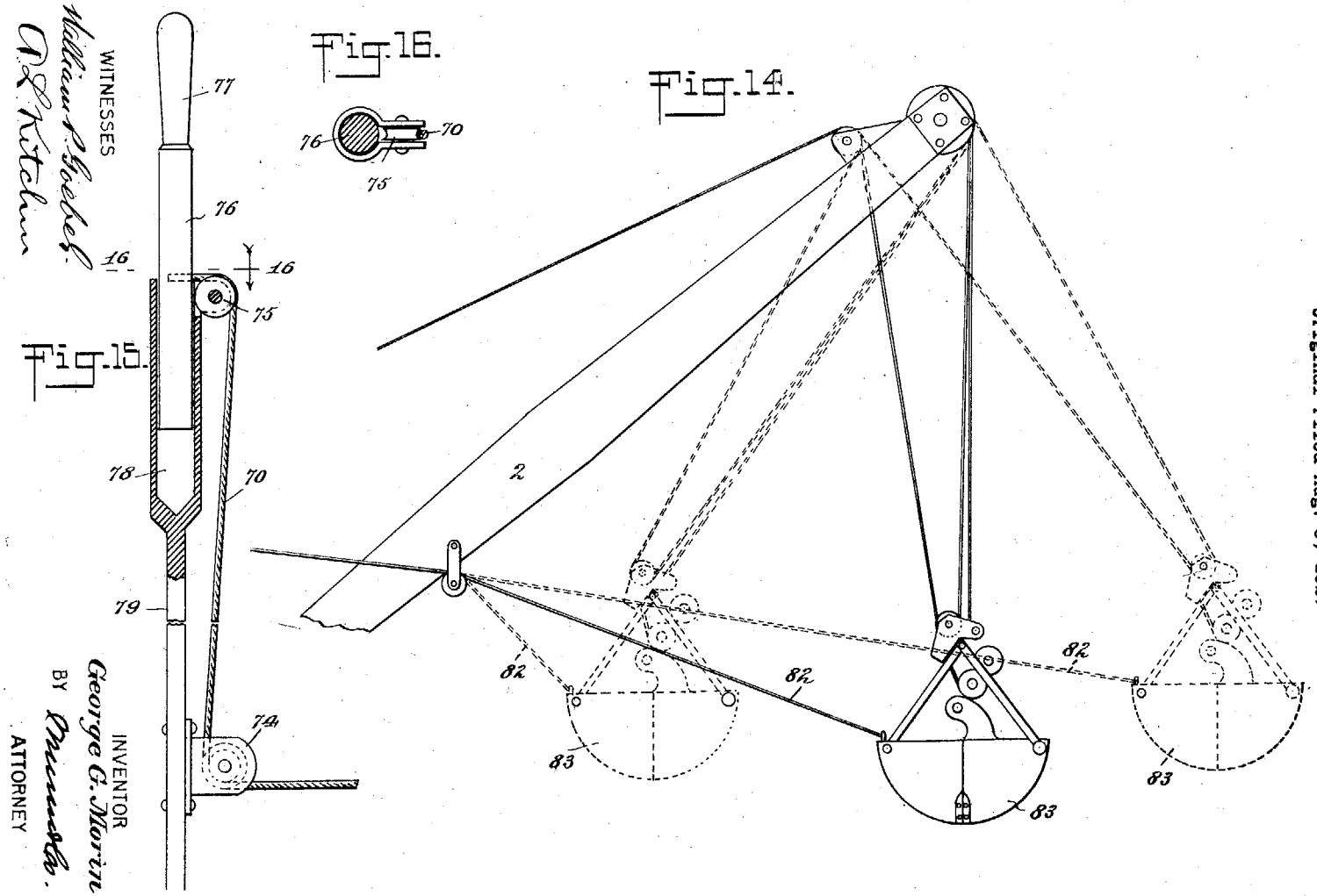
WITNESSES
William P. Goebel
A. L. Kitchen
INVENTOR
George G. Morin
BY Munn & Co.
ATTORNEY Reissued Oct. 11, 1932

Re. 18,617

UNITED STATES PATENT OFFICE

GEORGE GEDEON MORIN, OF HOLYOKE, MASSACHUSETTS

SEMIAUTOMATIC DIPPER TRIP AND MONKEY-LINE WINDER

Original No. 1,765,089, dated June 17, 1930, Serial No. 211,698, filed August 9, 1927. Application for reissue filed May 13, 1932. Serial No. 611,193.

This invention relates to an improved semi-automatic trip for power shovels, and has for an object to provide an improved simplified construction for operating the trip line or cable by mechanism actuated by steam, gasoline or other motive power.

Another object of the invention is to provide an improved re-winding mechanism for monkey lines, wherein the monkey line may be maintained taut, taken in and allowed to slacken as desired, for maintaining a clam-shell bucket in a desired position, or for swinging the bucket to a desired position.

A further object of the invention is to provide a semi-automatic dipper trip and monkey line winder for power shovels, wherein a constant rotating friction member is utilized, and means for connecting the same to a drum for causing a quick movement of the trip mechanism of the power shovel, or a desired movement of the monkey line.

In the accompanying drawings:

Fig. 9 is a sectional view through Fig. 3, approximately on line 9—9;

Fig. 14 is a side view in outline of the beam, bucket and associated parts of a clam shell shovel, together with a monkey line used in connection therewith;

Fig. 15 is a fragmentary view partly in section, showing how the monkey line illustrated in Fig. 14 is connected with the control lever; and Fig. 16 is a fragmentary sectional view through Fig. 15 on line 16—16.

Figure 1:
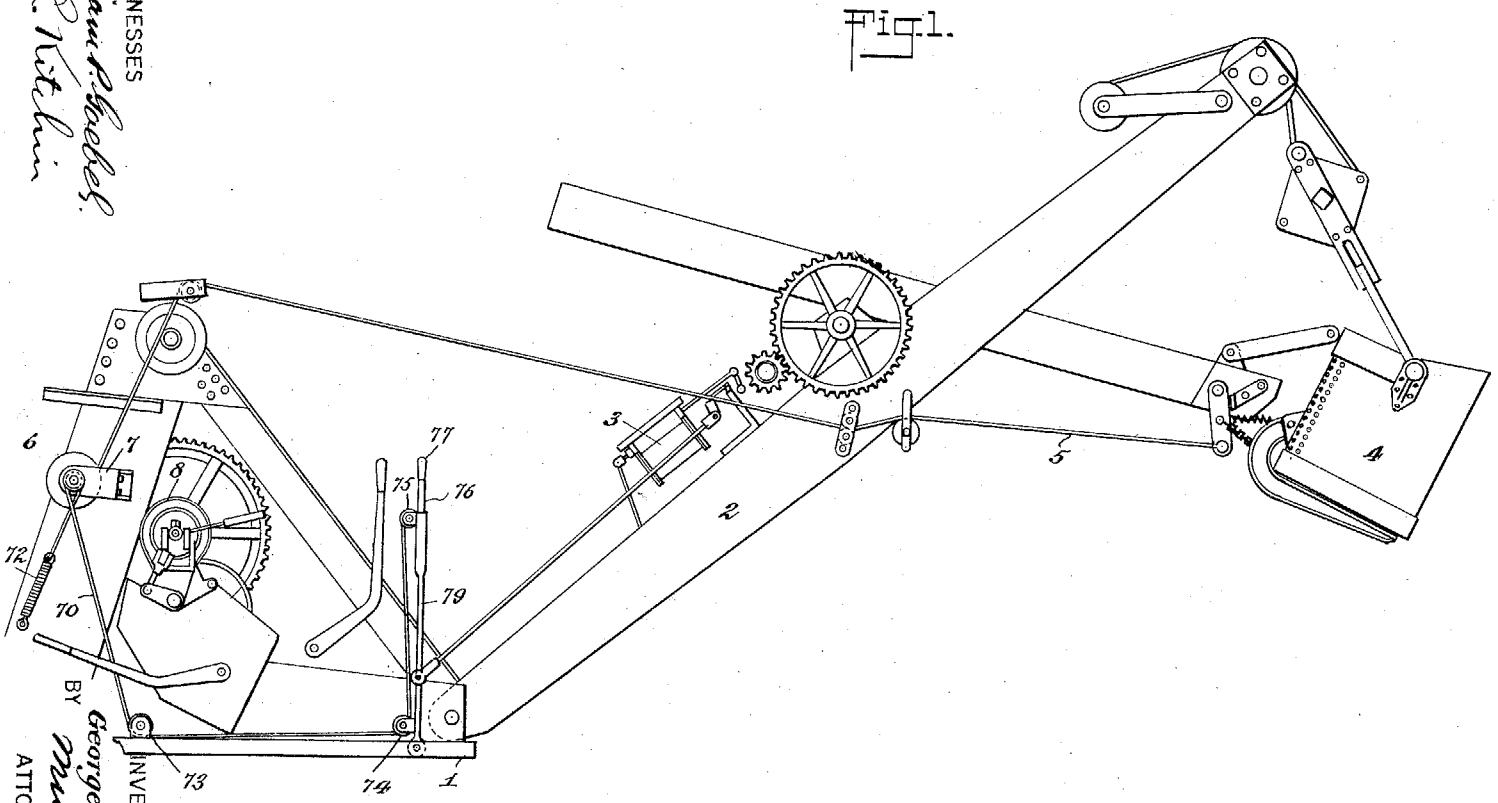
Fig. 1 is a fragmentary view of a power shovel with a device embodying the invention applied thereto.

Referring to the accompanying drawings by numerals, 1 indicates a shovel of a desired kind, the same being provided with the usual beam 2, crowding engine 3 and bucket or shovel 4 provided with the usual mechanism, including hauling ropes and a trip cable or rope 5. Usually heretofore, the trip cable 5 was operated by hand by pulling upon the same at the desired moment. In the present invention, power means have been provided which are set in motion for pulling this cable in order to trip the shovel 4 whenever desired, said power mechanism including mechanism for continually taking up the slack in cable 5, though permitting the cable to pay out when the shovel 4 moves outwardly. This power mechanism is indicated at 6 in Fig. 1, the same being mounted on the frame of the shovel 1 by suitable brackets 7. The power shovel 1 is shown driven by an electric motor 8, though it might be driven by steam or other power.

During the operation of the shovel, motor 8 continually operates, and is connected and disconnected by suitable mechanism so that the beam 2, shovel 4 and associated parts may function in the desired manner. A belt or other means may be used to connect the motor 8 with the power member 6, said belt passing over a suitable pulley (not shown) of the motor 8 and over the pulley 9 of the power member 6. The power member 6 is provided with a drum 10 over which the cable 5 is wound, said drum being connected, as hereinafter fully described, with the pulley 9 so that it will act to take up the slack in the cable 5 and also to pull the cable 5 positively whenever desired for tripping the shovel 4.

Figure 2:
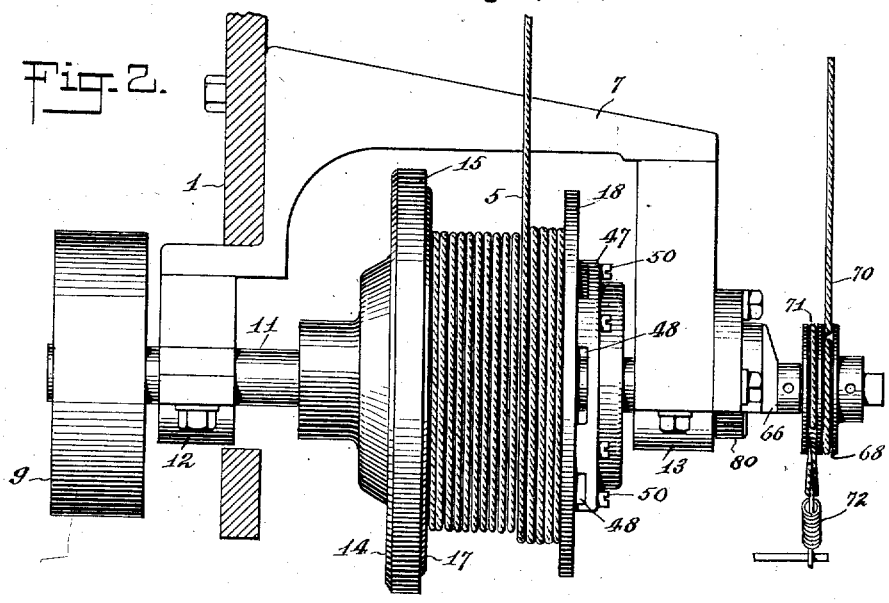
Fig. 2 is a top plan view on an enlarged scale of the device embodying the invention.
Figure 3:
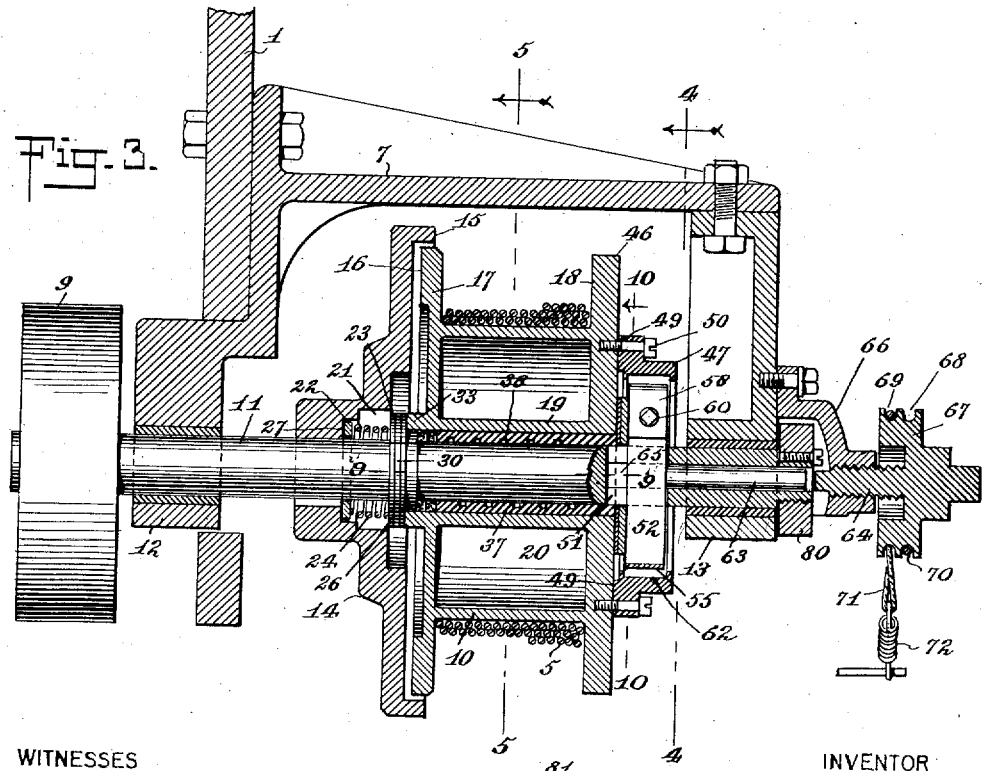
Fig. 3 is a vertical longitudinal central sectional view through Fig. 2.
Figure 8:
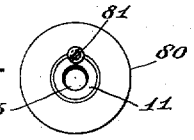
Fig. 8 is a detail end view of the power shaft and stop sleeve mounted thereon.
Figure 4:
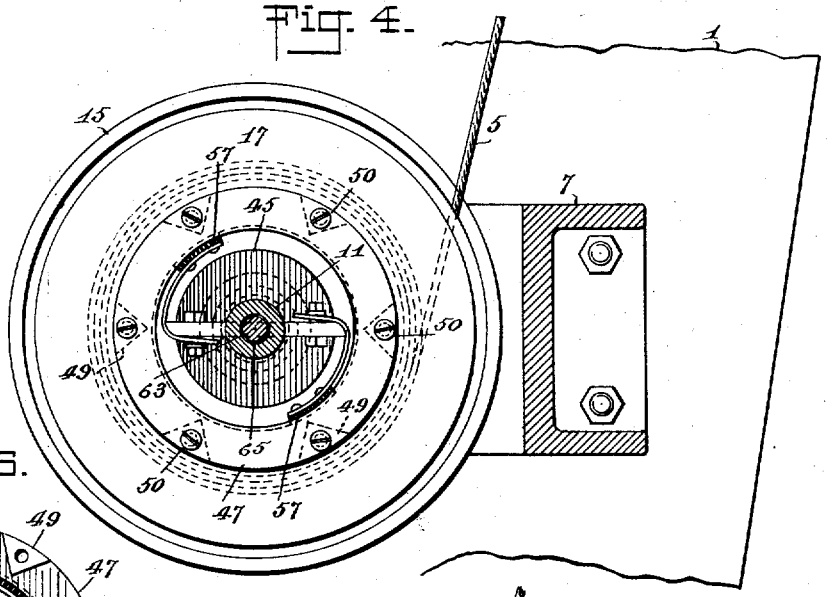
Fig. 4 is a sectional view through Fig. 3 on line 4—4.
Figure 6:
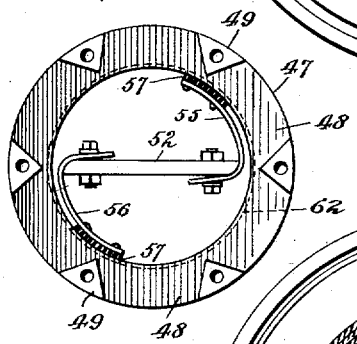
Fig. 6 is a detail view showing in elevation the friction ring and associated parts illustrated in Fig. 3.
Figure 5:
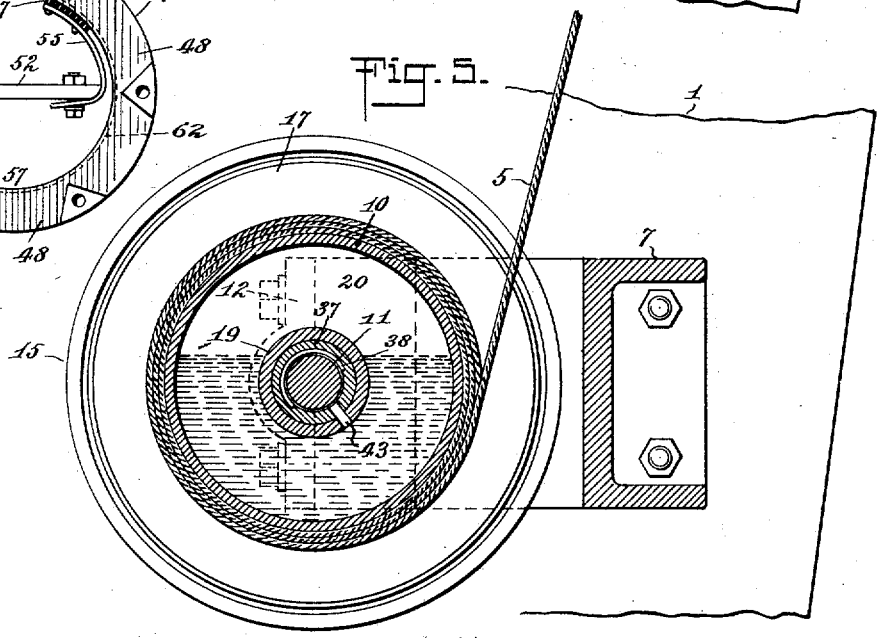
Fig. 5 is a sectional view through Fig. 3 on line 5—5.
Figure 7:
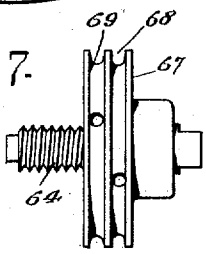
Fig. 7 is a side view of the pulley and thrust screw shown in Fig. 3.
Figure 8:
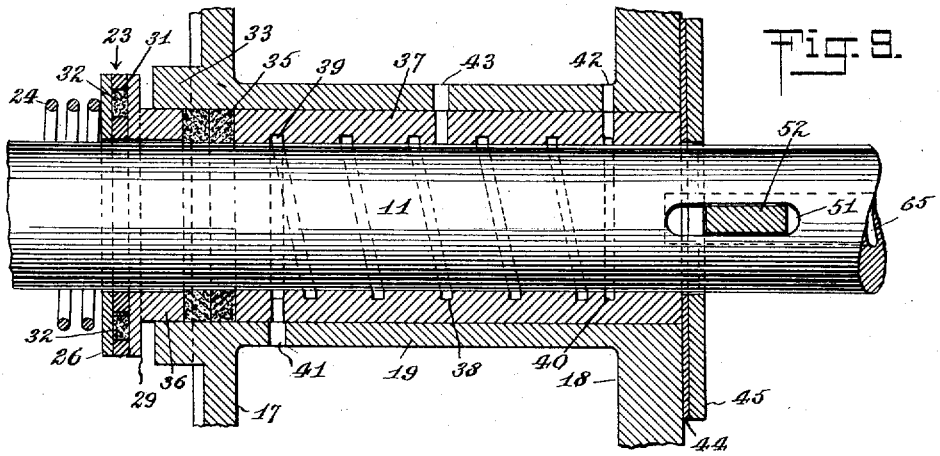
Figure 10:
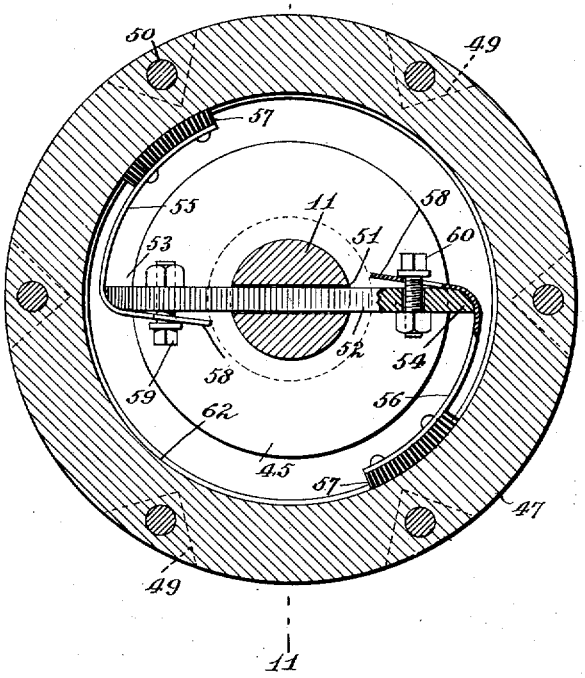
Fig. 10 is a sectional view through Fig. 3 on line 10—10.
Figure 11:
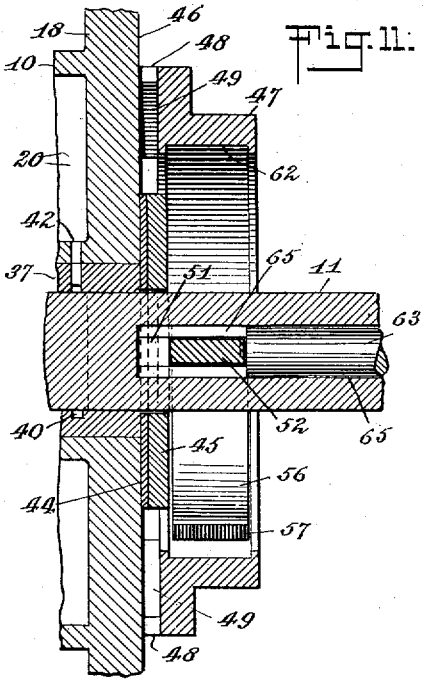
Fig. 11 is a sectional view through Fig. 10 on line 11—11.
Figure 12:
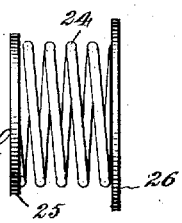
Fig. 12 is an enlarged detail side view of the tension spring and associated parts shown in Fig 3.
Figure 13:
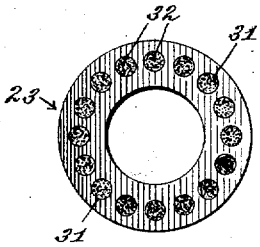
Fig. 13 is a side view of the thrust bearing illustrated in Fig. 9.

Referring more particularly to Figs. 2 and 3, it will be seen that the pulley 9 is rigidly connected with the power shaft 11 in any desired manner, the shaft extending through suitable bearing extensions 12 and 13 of the bracket 7. A driving or power disk 14 is keyed or otherwise rigidly secured to the shaft 11 so as to continually rotate therewith. This disk is provided with a flange 15 overhanging the friction surface 16 on the end 17 of drum 10. A second end 18 is provided for drum 10, together with a tubular center or sleeve 19, whereby there is provided a chamber 20 adapted to contain oil as shown in Fig. 5, said oil being permitted to pass from the chamber as hereinafter fully described for lubricating certain parts. The disk 14 is provided with a bore 21 having a recess 22. Bore 21 is adapted to accommodate a thrust bearing 23, together with part of the spring 24. The spring 24 is welded or otherwise rigidly secured to the washers 25 and 26, washer 25 bearing against the shoulder 27, while washer 26 bears against the thrust bearing 23. This thrust bearing is an anti-friction member 23, (Figs. 9 and 13). The washers 26 and 29 are preferably steel, while the anti-friction member 23 is preferably brass, and is provided with a number of apertures 31, said apertures being filled with lubricant 32, said lubricant being grease or other desired lubricating material. The tubular member or sleeve 19 of the drum 10, is provided with an extension 33 against which the thrust bearing 23 may act. An annular member 36 extending from washer 29 acts to compress the packing 35 when pressure is brought to bear on the respective parts. This packing is designed to prevent oil from passing axially along the shaft 11. As indicated in Fig. 9, a bearing sleeve 37 is arranged interiorly of the drum 10 and fits over shaft 11. A spiral groove 38 is provided in the sleeve 37 and merges into annular grooves 39 and 40 which register with the passage-ways or ports 41 and 42 respectively. These passage-ways or ports open into the chamber 20 so that oil may pass through these ports from the grooves 39 and 40, while oil may pass from chamber 20 through the passage-way 43 into the groove 38. In this way there is maintained a circulation of oil, and by reason of the packing 35, the oil cannot escape from the end of the drum. At the opposite end, friction disks 44 and 45 are provided which prevent to a large extent a flow of oil along the shaft 11, but in case any oil should flow along this shaft, it will move radially over the washer 45 and from thence over the outer surface 46 of end 18. A friction drum 47 is bolted or otherwise secured to the end 18, but is provided with openings 48 whereby the oil may freely escape radially over the surface 46. As indicated in Fig. 6, the friction drum 47 is provided with substantially V-shaped lugs 49 through which the respective screw members 50 extend.

As indicated in Figs. 3 and 9 to 11 inclusive, shaft 11 is provided with a slot 51 extending entirely therethrough, said slot accommodating the thrust bar 52, which thrust bar loosely fits into slot 51 and is provided with rounded ends 53 and 54 over which the resilient members 55 and 56 extend. These resilient members are comparatively stiff flat springs and are provided at one end with the respective friction blocks 57. At the opposite end, the end portions 58 normally set out from the thrust bar 52. Clamping and retaining bolts 59 and 60 are provided and extend through the portions 58 and through the thrust bar as shown particularly in Fig. 10, whereby the tension on the blocks 57 may be varied as desired. It will be noted that these blocks bear continually against the annular friction surface 62 of the friction drum 47, whereby this drum and drum 10 are given a tendency to rotate continually, as the shaft 11 continually rotates as long as motor 8 is functioning. As the power is transmitted through the friction blocks 57, there is only enough rotative power to take up the slack in cable 5. When this has been done, the blocks 57 merely skip around on the surface 62. When it is desired to give the cable 5 a decided pull so as to trip the shovel 4, means hereinafter fully described are operated, and the drum 10 forced toward the left as shown in Fig. 3 until the friction surface 16 presses against the power disk 14. This contact is sufficient to transmit the desired power for pulling cable 5 for tripping the bucket 4.

The mechanism hereinafter fully described, is such that the friction surface 16 may be pressed against the disk 14 with sufficient pressure to make a substantially positive drive and, consequently, all the power for cable 5 that is needed, is quickly provided. The mechanism for accomplishing this result, is shown particularly in Figs. 2 and 3. From these figures it will be seen that the shaft 11 at the end opposite the pulley 9, is provided with a longitudnial bore accommodating the reciprocating pin 63. This pin continually bears against the bar 52, but preferably never extends beyond the end of shaft 11. Co-acting with this bar is a thrust screw 64 having one end normally inserted slightly into the bore 65 and threaded into the fitting or spider 66 which is bolted or otherwise rigidly secured to the bracket 7. Integral with or rigidly secured to the screw 64 is a double pulley 67 provided with grooves 68 and 69. A hand operated control rope and cable 70 is secured to the pulley 67 and normally wound in groove 68. A retractile cable 71 is connected to spring 72, which spring in turn is connected to the frame of the power shovel 1 as shown in Fig. 1, while spring 72 tends to move the parts until they assume the position shown in Fig. 3, while spring 24 moves the drum 10 and associated parts away from the power disk 14. Cable 70 passes over suitable portions 73 and 74 and a pulley 75, so that the end may be readily secured to the reciprocating bar 76 (Fig. 15). The bar 76 is provided with a grip 77 at one end, while the opposite end is slidingly mounted in a socket 78 formed on the upper end of lever 79. Lever 79 is connected in any desired manner with the crowding engine 3, and if desired, with other mechanism. By the arrangement of the cable 70 and bar 76, lever 79 may be swung back and forth in any desired manner without affecting cable 70. When it is desired to pull cable 70 for rotating pulley 67, the bar 76 is forced downwardly into socket 78, or if desired, may be moved upwardly. Upon either moving the bar 76 upwardly or downwardly, cable 70 will be pulled and the pulley 67 rotated a sufficient distance for causing the screw 64 to engage pin 63 and force the pin and bar 52, together with the drum 10, over toward the disk 14 until the friction surface 16 firmly engages the disk 14. In this way, power is transmitted directly from the disk 14 to the drum 10 for pulling the trip cable 5 sufficiently to cause the shovel 4 to be tripped. The threads on the screw member 64 are of such a pitch that preferably a half revolution or even less, of pulley 67, will produce the results just described.

From Fig. 3 it will be noted that a stop collar 80 is screwed onto the end of shaft 11 and is locked in position by a screw 81, whereby when the drum 10 is forced into what may be termed a pulling position, the shaft 11 will not move longitudinally an appreciable distance. From the construction and arrangement of the springs 55 and 56 and associated parts, means are provided which will automatically take up the slack in cable 5. By the provision of screw 64 and associated parts, together with the power disk 14, means are provided for substantially positively driving the drum 10 for pulling cable 5 to produce the desired tripping operation.

Under some circumstances, the drum 10 and associated parts shown in Fig. 3, could be used for other purposes. For instance, when using a power shovel provided with a clamshell bucket as shown in Fig. 14, a monkey line 82 is provided. This monkey line ordinarily is operated by hand and is used to prevent the twisting of the supporting cables. In the present instance, the mechanism shown in Fig. 3 may be connected to the monkey line 82 and operated to not only cause the monkey line to function in the desired manner through the friction of members 57 and associated parts, but by reason of the disk 14 and associated parts, the line 82 could be pulled and then slackened once or several times, so as to swing the clamshell bucket 83, whereby the same may be caused to dump at a point beyond the outer end of the beam 2′ or at a point between the end of beam 2′ and the platform on which the beam rests. In many places, the power shovel must be located at some considerable distance from the matter to be excavated. When this is true, the beam 2′ extends over to the matter to be excavated, and then the bucket caused to function. If the excavated matter is to be moved still further over, the swinging action above described is very desirable, as it permits the bucket to be dumped at the desired point without shifting the power shovel, which would be difficult under some circumstances, as for instance, where there is a river or where the ground is very soft.

What I claim is:

1. In a trip for power shovels, a trip cable, a winding drum connected with said cable for winding the same, an annular friction member connected to said winding drum, a constantly rotating shaft on which said winding drum is loosely mounted, a friction drum connected to said winding drum, a bar extending through said shaft adjacent said friction drum, a spring mounted on each end of said bar formed with contact shoes frictionally engaging the inner surface of said friction drum for urging said friction drum and said winding drum to rotate for taking up the slack in said cable, a power disk rigidly secured to said constantly rotating shaft, and manually actuated means for forcing said bar and winding drum so that the winding drum will frictionally engage said power disk and be rotated thereby.

2. In a take up for power shovels, a trip cable, a drum for winding said trip cable, means for causing said drum to wind said cable, automatically actuated means for causing said drum to take up the slack in said cable, said automatically actuated means including a constantly rotating shaft having a slot extending therethrough, a bar extending loosely through said slot, a pair of adjustable flat springs carried by said bar, a contact shoe carried by each of said springs, an annular friction member positioned to be engaged by said shoes continually, and means for securing said annular friction member to said drum.

3. In a trip for power shovels, a trip cable, a drum for winding said cable, a constantly rotating shaft, means for rotating said drum for winding said cable, said means including a thrust screw, a pulley rigidly secured to said screw, said pulley being formed with a pair of grooves, a retracting cable in one of said grooves, a spring for causing said retracting cable to function, an actuating cable secured to said pulley and wound in the other of said grooves, a reciprocating bar for pulling said second cable, means for guiding said second cable as it is pulled, and a lever forming part of the power shovel provided with a socket for receiving said rod whereby said rod may be moved in either of two directions in said socket for causing said pulley and associated parts to function, said rod acting as the hand grip for said lever.

4. In a take up for power shovels, a trip cable, a drum for winding said trip cable, means for causing said drum to wind said cable, automatically actuated means for causing said drum to take up the slack in said cable, said automatically actuated means including a constantly rotating shaft, a bar carried by the shaft and rotated thereby, a spring connected to said bar adjacent each end, a contact shoe carried by each of said springs, an annular friction member positioned to be engaged by said shoes continually, and means for securing said annular friction member to said drum.

5. In a slack take-up for a cable, a winding drum for winding said cable, a constantly-rotating shaft, a power disk rigidly secured to said shaft and positioned adjacent one end of said winding drum, a friction drum secured to the end of said winding drum opposite said power disk, manually-actuated means for moving said winding drum against said power disk to cause said cable to be wound upon the winding drum, a bar rotated by said constantly-rotating shaft, and a resilient member carried by said bar positioned to press against said friction drum for causing the friction drum to move said winding drum sufficiently to take up slack in said cable.

6. In convertible material handling apparatus of the crane shovel type having interchangeable boom and bucket instrumentalities, the combination of a constantly rotating shaft, a drum adapted to receive a cable leading to the latch of the dipper when the apparatus is used as a shovel and to the bucket when the apparatus is used as a crane, means for providing a frictional coupling relationship between the shaft and the drum to produce a steady torque on the drum, mechanism for varying the degree of frictional coupling whereby a heavier constant torque may be produced when the cable is connected to a bucket than when the cable is connected to a dipper latch, and optionally operable means for augmenting the frictional coupling between the shaft and the drum to cause a substantially heavier temporary torque upon the drum and thus to exert a pull on the cable great enough to trip the dipper latch when the apparatus is used as a shovel or to swing the bucket when the apparatus is used as a crane.

GEORGE GEDEON MORIN.